Patented Mar. 24, 1953

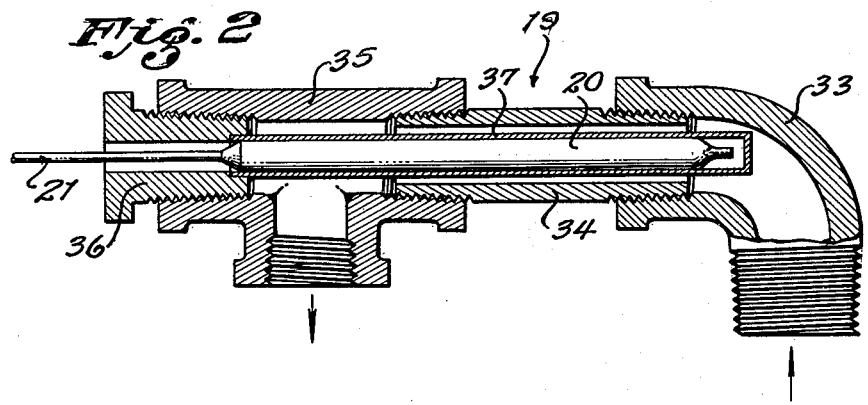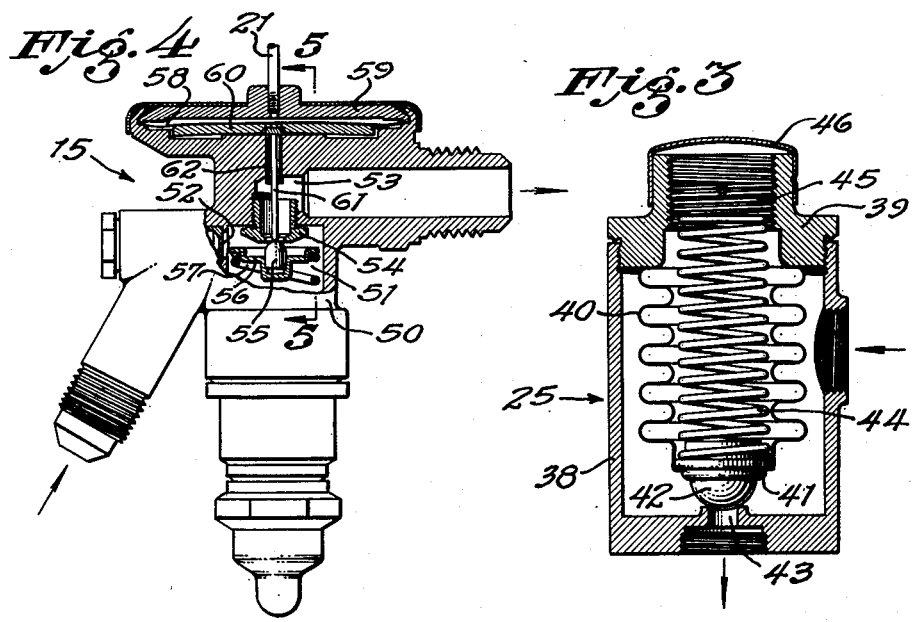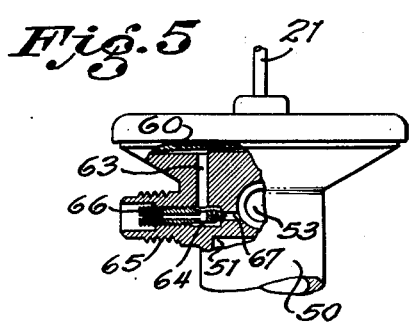

2,632,305

UNITED STATES PATENT OFFICE 2,632,305

REFRIGERATING SYSTEM

Harold J. Matteson, Glendale, Calif., assignor to General Controls Co., Glendale, Calif., a corporation of California Application August 14, 1950, Serial No. 179,169

1 Claim. (Cl. 62—4)

My present invention relates to refrigerating systems, and more particularly to those of the type which include a flooded evaporator.

For maintaining the level of liquid refrigerant in the evaporator constant, it has heretofore been customary to provide a control valve actuated by a float resting on the surface of the liquid.

It is a main object of this invention to provide an improved system for the purpose described wherein the requirement for a float valve or other moving parts in the evaporator is avoided; the regulation of refrigerant flow in my improved system being solely in response to the temperature of the vaporized refrigerant at the outlet of the evaporator.

For full understanding of the invention, and further appreciation of its features and advantages, reference is to be had to the following detailed description and accompanying drawing, and to the appended claim.

In the drawing:

Figure 2 is an enlarged sectional view of the thermostatic-bulb mounting indicated at 19 in Fig. 1;

Figure 3 is an enlarged sectional view of the regulator valve indicated at 25 in Fig. 1; and Figures 4 and 5 are enlarged views, mainly in section, of the thermostatic expansion valve indicated at 15 in Fig. 1; the view of Fig. 5 being taken along the line 5—5 of Fig. 4.

Figure 1:
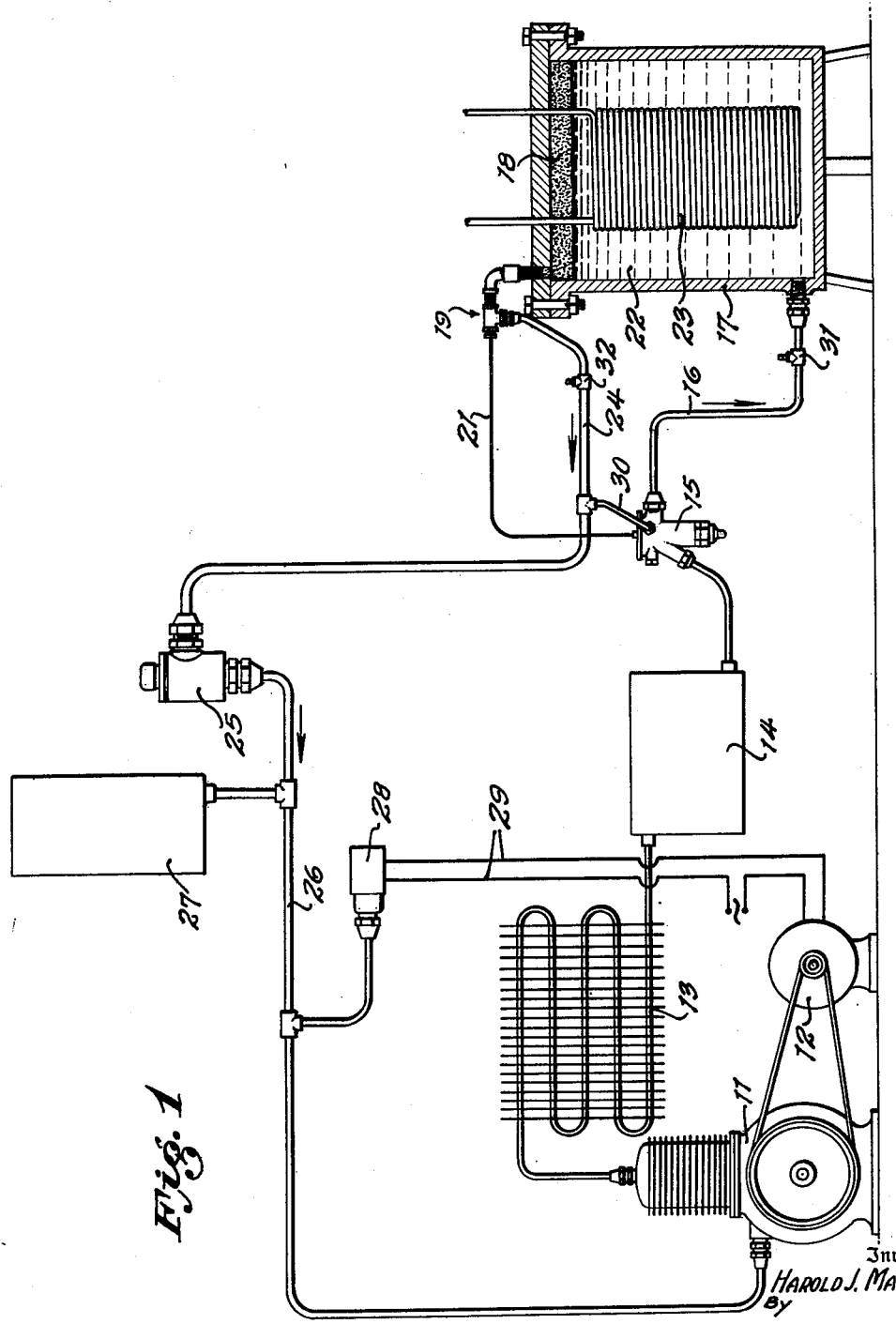
Figure 1 is a schematic view of a refrigerating system embodying my invention.

The system shown in Fig. 1 of the drawing comprises a compressor 11, driven by an electric motor 12, whereby compressed refrigerant is supplied through a condenser 13 and receiver 14 to a thermostatic expansion valve 15 whose internal construction is shown in Figs. 4–5. Under the control of this valve the refrigerant passes through a pipe 16 to the bottom of a tank evaporator 17 and thence, in the form of vapor 18 at the top of the tank, through a fitting 19 (see Fig. 2) which forms a mounting for a thermostatic bulb (shown at 20 in Fig. 2) for controlling the operation of the thermostatic expansion valve 15 and connected thereto by a capillary tube 21. Immersed in liquid refrigerant 22 in tank 17 is a coil 23 through which liquid to be cooled, such as brine, beverage, or the like, is circulated.

From the fitting 19 the vaporized refrigerant passes through a pipe 24 to a regulator valve 25 (see Fig. 3) and thence through suction line 26 back to the compressor. Connected to the suction line 26 is a surge tank 27, and a pressure switch 28 for controlling the on- and off-cycles of the system and connected to motor 12 by wires 29 in series with a source of A. C. indicated by the symbol. Between pipe 24 and the thermostatic expansion valve 15 is an external equalizer connection 30. In pipes 16 and 24 are manual valves 31 and 32, respectively, for a purpose to be described.

The fitting 19, as shown in Fig. 2, comprises an elbow 33 threaded for securement in an opening through the top wall of tank 17 and connected by a nipple 34 to a pipe-T 35. In the outer end of this T is a threaded bushing 36 which carries an elongated thin-walled metallic tube 37 whose end within elbow 33 is closed, the other end of the tube fitting in a recess in the bushing and being soldered thereto. The tube 37 forms an open well for the thermostatic bulb 20 which fits the tube snugly so that the bulb is in good thermal transfer relation to the vaporized refrigerant flowing in the space around the tube.

The regulator, or constant-back-pressure, valve 25 shown in Fig. 3 comprises a cylindrical casing 38 having a threaded cap 39. Soldered at its upper end in an opening through this cap is an expansible-contractible metallic bellows 40 whose lower end is soldered to a cylindrical member 41 having a recess in its underside for a spherical closure 42 cooperable with a port 43 at the outlet of the valve. The closure 42 is biased toward seating position by a compression spring 44 within the bellows and bearing against an adjusting screw 45 threaded in the opening through cap 39. On the top of the cap is a dust cover 46.

The essential structure of the thermostatic expansion valve 15 is shown in Figs. 4 and 5, the latter figure being a fragmentary section taken along the line 5—5 of Fig. 4. In these figures the numeral 50 indicates a valve casing having an inlet chamber 51, into which the refrigerant enters through an orifice 52, and an outlet chamber 53. Separating these chambers is a ported member 54 providing at its underside a valve seat with which a closure 55 cooperates; the closure being mounted in a central depression in a disk 56 against whose flange a bias spring 57 bears.

At the top of the valve casing 50 is a pressure motor comprising a flexible diaphragm 58 which is clamped at its margin to the casing by a cover plate 59 secured in place as by solder. Below the diaphragm 58 is a pusher plate 60 which is operatively connected to the closure 55 by a rod 61 around whose upper portion is a liner 62 fitting an opening into the outlet chamber 53; the fit of the liner being so close that the opening is virtually sealed. The space above the diaphragm or partition 58 is connected by capillary tube 21 to the thermostatic bulb 20 so that the pressure of the thermally expansive charge in the bulb (preferably, refrigerant of the same type as that circulating in the system) is applied to the diaphragm in valve-opening direction; the opposing force of spring 57 determining the superheat setting of the valve.

As can be seen in Fig. 5, the space below the diaphragm 58 and pusher plate 60 communicates, by way of a vertical passage 63, with a horizontal opening 64 drilled in a boss 65 to which the external equalizer connection 30 is attached. Threaded in the opening 64 is a screw 66 which is drilled axially and transversely so that opening 64 is virtually unobstructed by the screw. The screw 66 has a conical tip which, when the valve motor is externally equalized as shown, serves to obstruct communication between opening 64 and a smaller aligned opening 67 leading to the outlet chamber 53 of the valve. To provide an internal equalizer connection in place of the external one, screw 66 would be unthreaded a few turns and a sealing cap attached to the boss 65.

The regulator valve 25, opening against the force of spring 44 under the pressure of refrigerant on the head of bellows 40, throttles flow of refrigerant from the evaporator 17 to maintain the pressure therein at a constant value during both the on- and off-cycles occurring in normal operation of the system. Since the external equalizer connection 30 is at the outlet of the evaporator ahead of the regulator valve 25, the pressure below the diaphragm or partition 58 of the thermostatic expansion valve is likewise maintained constant.

The operation of the thermostatic expansion valve in this system is therefore responsive solely to the pressure above its diaphragm, which pressure is a function of the temperature of the thermostatic bulb 20. This bulb is in good thermal transfer relation to the vaporized refrigerant 18 in fitting 19 so that that refrigerant is maintained at a constant degree of superheat and the level of the liquid refrigerant 22 remains constant. The level of the liquid in the evaporator is inversely proportional to the superheat setting of the thermostatic expansion valve, as is determined by the force of its bias spring 57. With constant ambient temperature of the evaporator the level of the liquid therein is maintained as closely as it could be with a conventional low-side float.

While it is preferable to provide an external equalizer connection for the motor of the thermostatic expansion valve when the system comprises an evaporator of the tank type, the thermostatic expansion valve may be internally equalized when there is but a small head of liquid and/or slight pressure drop across the evaporator, as when the same is of the coil type.

The setting of the compressor-controlling pressure switch 28 must be below that of the regulator valve 25; for example, if the regulator valve is set to maintain a pressure of 40 pounds per square inch in the evaporator, the pressure switch should then be set to start the on-cycle at about 35 pounds and the off-cycle at about 10 pounds. Refrigerant is still passing, at low-rate, through the regulator valve at the end of the on-cycle. The area of the port 43 of the regulator valve is made small in relation to the effective area of the bellows to minimize the effect of suction on this valve.

The surge tank 27 serves to protect the compressor and to prevent the possibility of abnormal intermittent operation of the pressure switch due to the presence of the regulator valve in the system; this tank should therefore be of relatively large capacity.

The purpose of the manual valves 31—32 is to isolate the evaporator when repairing the thermostatic expansion valve; it not being necessary in this system to drain the evaporator to effect repair of control parts subject to wear, as is the case in a system employing a conventional float valve.

The specific embodiment of my invention herein shown and described is obviously susceptible of modification without departing from the spirit of the invention, and I intend therefore to be limited only by the scope of the appended claim.

I claim as my invention:

A refrigerant control system for maintaining, without the use of a float valve, a constant level of liquid refrigerant in a flooded evaporator of the tank type having adjacent its bottom an inlet for liquid refrigerant, and an outlet for vaporized refrigerant communicating with the space above the liquid refrigerant, comprising: a thermostatic expansion valve for controlling flow of the liquid refrigerant to said evaporator, said valve comprising a pressure motor having a movable partition for operating the valve, means for applying to one side of said partition the pressure of the vaporized refrigerant at said outlet of the evaporator, and a charged thermostatic bulb subjected to the superheat of said vaporized refrigerant and connected to apply the pressure of its charge to the other side of the partition; a pressure-operated throttling valve controlling passage of the refrigerant from the evaporator so as to maintain the pressure in the evaporator substantially constant, whereby the pressure applied to said one side of said partition is also constant and the operation of said thermostatic expansion valve is therefore responsive only to the temperature of said bulb, said pressure-operated valve being biased to closed position and opening under the pressure of the refrigerant in the evaporator; and means responsive to the pressure of the refrigerant at the outlet of said pressure-operated valve for effecting on- and off-cycling of the system.

HAROLD J. MATTESON.

REFERENCES CITED

The following references are of record in the file of this patent:

UNITED STATES PATENTS

| Number | Name | Date |
| --- | --- | --- |
| 2,155,516 | Tull et al. | Apr. 25, 1939 |
| 2,197,582 | Kaufman | Apr. 16, 1940 |
| 2,309,773 | Kaufman | Feb. 2, 1943 |
| 2,418,853 | Shoemaker | Apr. 15, 1947 |
| 2,506,757 | Wilson | May 9, 1950 |
| 2,523,451 | Schulz | Sept. 26, 1950 |